COLOR IMAGE PICK UP APPARATUS

Filed March 9, 1955 2 Sheets-Sheet 1

INVENTORS:
Franz F. Ehrenhaft,
Seymor Rosin and Madison Cawein
BY:
Michael S. Striker
agt.

April 28, 1959 F. F. EHRENHAFT ET AL 2,884,483

COLOR IMAGE PICK UP APPARATUS

Filed March 9, 1955 2 Sheets-Sheet 2

INVENTORS:
Franz F. Ehrenhaft,
Seymor Rosin and Madison Cawein
BY: Michael S. Striker
agt.

2,884,483
Patented Apr. 28, 1959

2,884,483

COLOR IMAGE PICK UP APPARATUS

Franz F. Ehrenhaft, Forest Hills, and Seymour Rosin, Massapequa Park, N.Y., and Madison Cawein, Fort Wayne, Ind., assignors to Grimson Color Inc., New York, N.Y.

Application March 9, 1955, Serial No. 493,234

24 Claims. (Cl. 178—5.4)

The present invention relates to a new and improved method and apparatus for color reproduction. More particularly, the present invention relates to a new and improved method and apparatus for producing a color image of an object and converting the color image into a plurality of current impulses substantially proportional to the intensity of the different parts of the color image.

One of the major problems in color television systems today is the image reproduction system for producing and transmitting a color image of an object. Most systems in use today produce three separate images of the object to be reproduced at a color television receiver. The three images are picked-up or reproduced on three separate pick-up tubes. Each of these images is in a different color, usually produced by passing the light rays from the object through three separate color filters.

The most common filters used are the red, blue and green filters. Therefore, in the conventional pick-up system, the light rays coming from the object are divided by a lens system into three separate sets of similar light rays. One set passes through a blue filter to the first pick-up tube. The second set passes through a green filter to the second pick-up tube and the third set passes through a red filter to the third pick-up tube.

The single color images on each of the pick-up tubes are then scanned by the respective electron beams of the pick-up tubes. The scanning is done in a synchronized manner so that the three separate single color images are transmitted with a particular pattern and time relationship so that they are superimposed in the color television receiver to produce a single color image of the televised object.

It is apparent that in such a system the various lenses must be carefully aligned with respect to the three separate pick-up tubes which in turn must be critically adjusted to assure the production of three similar images. Also, it is clear that the intensity of each of the images is approximately one-third the intensity of the light rays reaching the pick-up device. Accordingly, to obtain a reproducible image, the object must be highly illuminated. The disadvantages of such a situation are apparent.

The present invention overcomes these difficulties by using only a single pick-up tube and by producing a multi-color image on the photo-responsive surface of the pick-up tube. This multi-color image is produced in such a manner that the image is sharply defined and each of the component colors thereof has a substantially high intensity. Accordingly, by use of the present invention it is possible to produce a high intensity sharply defined multi-color image of an object.

It is an object of the present invention to provide a new and improved method and apparatus for producing a multi-color image of an object.

Another object of the present invention is to provide a new and improved method and apparatus for converting a multi-color image of an object into a plurality of current impulses substantially proportional to the intensity of the different parts of the image.

A further object of the present invention is to provide a new and improved pick-up tube for use in a color television system.

Still a further object of the present invention is to provide a multi-color image reproduction system which uses a multi-color filter and a grating to produce a multi-color image of an object.

With the above objects in view, the present invention mainly consists of an apparatus for producing a color image of an object including a photo-responsive surface on which the color image is to be produced, an objective lens positioned between the object and the photo-responsive surface so that the photo-responsive surface is in the focal plane of the objective lens, a color filter composed of at least two sets of color filter bands arranged side by side in a plane positioned between the object and the photo-responsive surface substantially parallel to the latter, and a grating arranged between the color filter and the photo-responsive surface substantially parallel to the latter so that the first overlap of the color filter bands caused by the grating occurs on the photo-responsive surface to increase the intensity and definition of the produced image.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3:
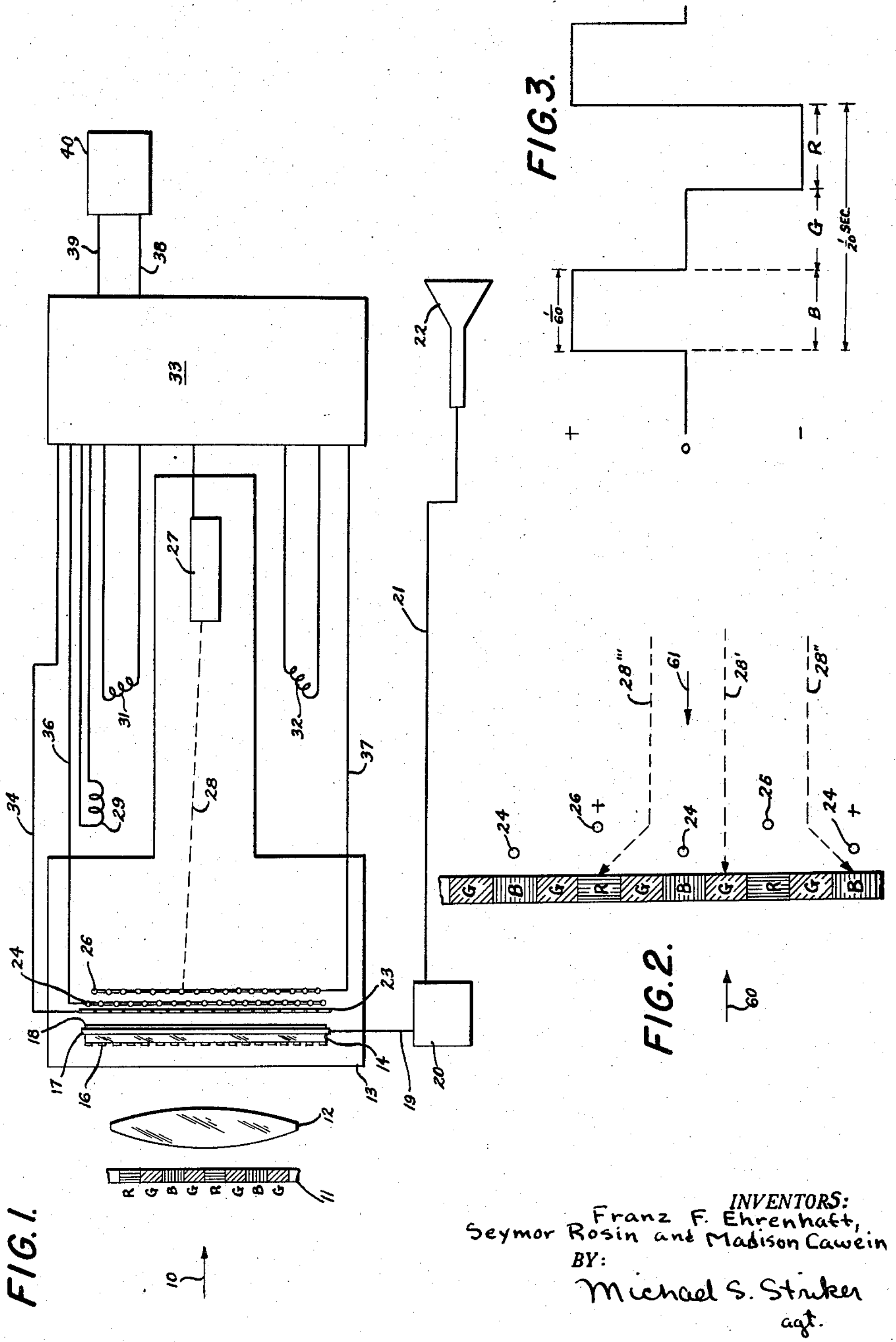
Fig. 1 is a diagrammatic representation of a color reproduction system in accordance with the present invention.
Fig. 2 is a diagrammatic representation of a portion of the three-color image produced by the present invention.
Fig. 3 is a graphical representation of the impulses used to synchronize the scanning of the produced image.

Referring now to Fig. 1 the object (not shown) to be reproduced emits light rays travelling in the direction of the arrow 10. These light rays pass through a color filter 11. The color filter 11 in the illustrated embodiment is composed of two sets of color filter bands arranged side by side. In the illustration the letter R represents the red color; the letter G represents the green color; and the letter B represents the blue color.

Figures 4, 5, 6:
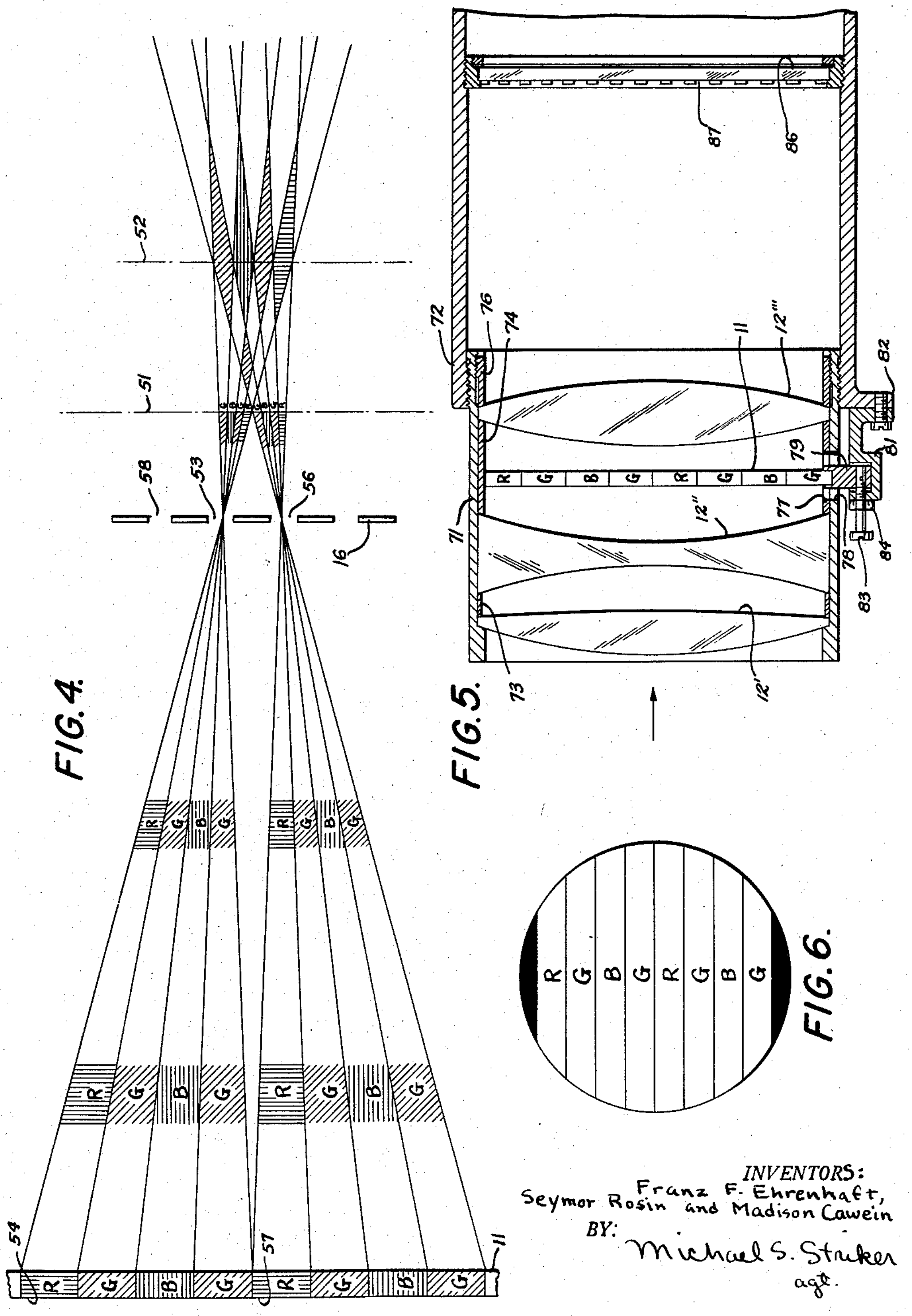
Fig. 4 is a diagrammatic representation showing the separation of the light rays passing through the color filter and grating used in the present invention.
Fig. 5 is a transverse cross sectional view of a preferred embodiment of the filter and lens arrangement used in accordance with the principles of the present invention.
Fig. 6 is a front view of the color filter shown in Fig. 1.

As shown in Fig. 6, each set of color filter bands of the color filter 11 is composed of four parallel bands or strips so that a total of eight parallel strips is included in the color filter. In Fig. 6 the uppermost strip is red; the next is green; the next lowermost is blue; and the last strip of the band is green. Therefore, each of the red and blue strips is separated by a green strip so that there are twice as many green strips in the color filter as either red or blue.

Referring again to Fig. 1, the rays which have passed through the color filter 11 now pass through a lens 12. Near the lens 12 is a pick-up tube having a glass envelope 13. Mounted within the glass envelope 13 is an optical glass plate 14 on the front surface of which is arranged a grating 16. On the opposite surface of the glass plate 14 is mounted a translucent electrically conductive coating 17. Arranged next to the conductive coating 17 is a photo-conductive surface 18. The photo-conductive surface 18 may be arranged or deposited by vaporization on top of the coating 17 in a manner well known in the art.

Connected to the electrically conductive coating 17 is one end of an output conductor 19, the other end of which is connected to the input of a video amplifier 20. Video amplifier 20 is shown only in block form because it may be constructed in any of several well known manners. Connected to the output of the amplifier 20 is one end of a conductor 21, the other end of which is connected to the input of a cathode ray tube which may be any one of several types of color cathode ray tubes used for displaying a color image of a televised object.

Within the pick-up tube envelope 13 and adjacent the photo-conductive surface 18 is a post-accelerating electrode 23. Mounted next to the electrode 23 are two grids 24 and 26, respectively. Each of the grids 24 and 26 is composed of a plurality of parallel rods which are respectively connected together. Actually, the grids 24 and 26 may be arranged in a substantially coplanar manner but they are shown in different planes in order to more easily understand the operation of the apparatus. It is clear that the various parts of the pick-up tube may be mounted within the glass envelope 13 in any manner well known in the art. The mounting arrangements are not shown in order to avoid unnecessarily complicating the drawing.

At the opposite narrow end of the pick-up tube is arranged the electron gun 27 which emits an electron beam 28. Arranged about the narrow portion of the pick-up tube is a focusing coil 29 and horizontal and vertical scanning coils 31 and 32, respectively. These three coils are arranged in a conventional manner with the scanning coils 31 and 32 being mounted at right angles to each other and to the electron beam so as to provide the proper scanning of the image by the electron beam.

The coils 29, 31 and 32 are connected to respective outputs of the power and deflection unit 33. Unit 33 is a conventional unit which supplies sawtooth wave shapes for the horizontal and vertical scanning of the image by the electron beam. That is, the sawtooth current applied to the horizontal deflection coil 31 deflects the electron beam 10 from left to right. Simultaneously, and in a conventional prearranged synchronized manner, the sawtooth current applied to the vertical deflection coil 32 moves the electron beam from the top to the bottom of the image.

Also connected to respective outputs of the unit 33 are the post accelerating electrode 23, by means of a conductor 34; the grid 24 by means of a conductor 36; and the grid 26 by means of a conductor 37. In this manner, operating potentials, usually direct-current, are applied to the conductive coating 17, the post-accelerating electrode 23, the grids 24 and 26 and the electron gun 27. Some of these connections are not shown in order to avoid unnecessarily complicating the drawing. For example, anode-space shields may be inserted between or around the various tube elements and proper operating potentials supplied thereto in order to provide the proper beam-scanning action that is conventionally provided in pick-up tubes of the type described. It is clear that these connections can be made to the unit 33 in the conventional manner well known in the art.

To one of the inputs of the member 33 is applied the output of a synchronizing generator 40 by means of conductors 38 and 39. The generator 40 serves to synchronize the horizontal and vertical scanning voltages with the potentials applied to the grids 24 and 26.

To understand the operation of the pick-up tube and the advantages thereof it is necessary to first understand the effect of the combination of the color filter 11 and the grating 16 on the light rays emitted from the object. Referring to Fig. 4, this effect will be demonstrated. The percentage of light transmitted through each of the colored strips of the color filter 11 depends upon what percentage of the particular primary color is present in the light. In other words, if a portion of the object is red, substantially all of the light rays emitted from this portion and reaching the color filter 11 will pass through the red strips of the filter 11. At the same time, substantially all of this red light reaching the green and blue strips will be completely attenuated thereby. The reverse effect is true for each of the other respective primary colors emitted by the object.

Similarly, if a portion of the object contains a color that is a combination of the two or three primary colors, some proportion of the light emitted from this portion of the object will be transmitted by each of the strips and some proportion will be attenuated.

In Fig. 4 the effect of two of the openings 53 and 56 of the grating 16 is shown. Actually, the number of openings or slits in the grating 16 greatly exceeds the number of strips in the filter 11. For example, in the illustrated embodiment only eight filter strips are used while the corresponding number of openings in the grating is of the order of one thousand. Therefore, in Fig. 4 it is apparent that the actual size of the openings of the grating 16 is greatly magnified for the purposes of understanding the operation thereof.

Each of the openings of the grating 16 acts effectively as the opening of a pinhole camera. Therefore, if a plane parallel and comparatively close to the grating were to intersect the light passing through one of the openings of the grating, an exact image of the object emitting the light entering the grating would be obtained. As this intersecting parallel plane moves farther to the right of the grating 16 a position would be reached where the images formed by adjacent openings of the grating would be exactly contiguous to one another. This position is shown by the line 51 whereon it can be seen that eight parallel colored strips will be obtained behind each grating opening, but only four such strips are shown for each grating. In accordance with the reversing effect of a pinhole camera, the position of the colored strips at the plane position 51 are just the reverse of their position at the color filter 11.

If the parallel intersecting plane were to be moved still farther to the right of the grating 16, the light emitted by each of the openings of the grating 16 would begin to overlap with the light emitted by its adjacent opening. The plane could continue to move to the right until the position of the first complete overlap is obtained. This position is indicated by the line 52. In the illustrated first overlap position 52 it is seen that the image produced by the effect of one of the openings on the light transmitted through one of the sets of filter bands exactly corresponds to the image produced by the adjacent opening on the light transmitted through the other set of filter bands. That is, the image produced at the plane position 52 by the upper opening 53 of the grating 16 on the light transmitted through the red filter strip 54 exactly corresponds to and overlaps the image produced by the adjacent lower opening 56 on the light transmitted through the lower red strip 57.

It can be seen that the width of the red image of these two red filter strips 54 and 57 at the position 52 is substantially double the width of each of the images at the position 51. It is apparent that the intensity of the red image is also increased due to the reinforcing effect of the two overlapping red images at the position 52. Similarly, it can be seen that each colored strip in the upper set of the filter produces an image at the position 52 which exactly corresponds to and is reinforced by the overlapping image produced by the similar colored filter strip in the lower set.

It is apparent that the opening 53 of the grating 16 will produce an image of the light passing through the lower four filter strips in the plane position 52 which will exactly correspond to and overlap the image produced by the upper opening 58 of the light passing through the upper four filter strips. Therefore, in the plane position 52, each opening of the grating will combine with its two adjacent openings to produce three adjacent images of the color filter 11 reinforcing each other in the overlapping area. Each of these reinforced images will have only half the number of the original number of strips in the filter 11. In the example shown, there are eight filter strips in the filter 11 and only four strips in the image. However, each of the strips in the image is the result of the superposition of the light passing through two similarly colored strips in the filter 11 and accordingly the intensity of the strip at the image position 52 is very high. Because the first overlap position is accurately defined, the images are sharply defined.

In view of the above, it is seen that a plurality of adjacent overlapped images of the light passing through the color filter 11 is produced at the plane position 52 by the grating 16. Also, the number of overlapped images produced corresponds to the number of openings in the grating 16. Of course, it is clear that to obtain the advantages of sharply defined overlapping, reinforced images described above, the lines and spaces of the grating 16 should preferably be arranged parallel to the sets of filter bands.

Referring again to Fig. 1 it can now be seen that the distance between the color filter 11 and the grating 16 and the distance between the grating 16 and the front surface of the photo-conductive surface 18 can be arranged so that the position of the first overlap produced by the grating 16 occurs on the front surface of the photo-conductive surface 18. At the same time, the distance between the lens 12 and the surface 18 is adjusted so that the front surface of the photo-conductive surface 18 is in the focal plane of the lens 12.

By the above arrangement and by the explained effect of the grating 16 it is seen that a three-color image of the object is produced on the front surface of the photo-conductive surface 18. The three-color image is composed of a plurality of adjacent parallel strips of the type shown in Fig. 4. It should be appreciated that each reinforced image of four adjacent parallel strips as shown in Fig. 4 in the plane position 52 covers only an elemental area of the image of the object. This becomes clear when it is realized that a grating of one thousand openings produces one thousand adjacent reinforced images in an area that is less than 3″ in length.

Once the three-color image has been produced on the front surface of the photo-conductive surface 18 various methods may be used to produce current impulses substantially proportional to the intensity of the image. In the pick-up tube illustrated in Fig. 1 the post accelerating electrode 23 in combination with the grids 24 and 26 and the electron beam 28 combine to produce the desired current impulses.

Referring now to Fig. 2 the operation of the grids will be explained. In Fig. 2 is shown an edgewise top view of a portion of the photo-conductive surface 18. Since the image is in the focal plane of the objective lens 12 it theoretically occupies a thin line in the view shown in Fig. 2. However, the thickness of this line is magnified in Fig. 2 to understand the operation of the invention. Several of the rods of the grids 24 and 26 are also shown in Fig. 2. As previously mentioned, all of the rods of the grid 24 are connected together and all of the rods of the grid 26 are respectively connected together. Also, the rods of both grids may be arranged in a coplanar fashion but the grids are shown spaced in Fig. 2 for purposes of clarity. The light emitted from the lens 12 comes from the direction indicated by the arrow 60 and the electron beam emitted by the electron gun 27 comes from the direction indicated by the arrow 61.

There are as many rods in the grid 24 and in the grid 26 as there are openings in the grating. The position of the grating is arranged so that the centers of the images of the blue filter strips are aligned respectively with the rods of one of the grids and the centers of the images of the red filter strips are aligned respectively with the rods of the other of the grids. As shown in Fig. 2 the center lines of the images of the blue filter strips are aligned respectively with the rods of the grid 24 and the center lines of the images of the red filter strips are aligned respectively with the rods of the grid 26.

Since each of the rods of the grids 24 and 26, respectively, are aligned with the centers of one image of a filter strip, it is clear that they are preferably parallel to the images of the filter strips. Accordingly, the rods of the grids are arranged parallel to the lines of the grating and parallel to the filter strips in the color filter 11.

From the above arrangement it is seen that the center lines of the images of the green filter strips are automatically aligned respectively with the centers of the spaces between adjacent rods of the grids 24 and 26. The electron beam coming in the direction of the arrow 61 scans the photo-conductive surface 18 in a horizontal direction perpendicular to the rods of the grids 24 and 26. The rate of this horizontal scanning is controlled by the sawtooth current applied to the horizontal deflection coil 31.

If the potential applied to the grid 24 is equal to the potential applied to the grid 26 the electron beam reaching the photo-conductive surface 18 will be undeflected by the grids 24 and 26 and will impinge on the center of the green image strip. Therefore, as the electron beam is scanned horizontally it will impinge only on the green image strips on the photo-conductive surface 18 as indicated by the dotted line 28′.

If the potential applied to the grid 24 is higher than the potential applied to the grid 26, the electron beam will be attracted towards the rods of the grid 24 and will impinge on the blue image strip adjacent the grid 24. This is indicated by the dotted line 28″. Therefore, if this higher positive potential is maintained on the grid 24 during the entire time that the electron beam is horizontally scanned, the electron beam will impinge only on the blue image strips.

Similarly, if the potential applied to the grid 26 is higher than the potential applied to the grid 24, the electron beam will be deflected towards the rods of the grid 26 and will impinge upon the red image strip. This is indicated by the dotted line 28‴. If this difference of potential is maintained while the beam is horizontally scanned, the electron beam will impinge only on the red image strips.

Referring now to Fig. 3, a graphical representation of a wave shape of a voltage impulse series is shown. This is the wave shape of the synchronizing voltage applied between the grids 24 and 26. In one satisfactory arrangement the electron beam scans vertically at a frequency of approximately 60 cycles per second while it simultaneously scans horizontally at a frequency of approximately 15,735 cycles per second. If the width of each of the pulses shown in Fig. 3 is approximately 1/60 of a second, the repetition rate of the voltage would be approximately 20 times per second.

As can be seen by comparing Figs. 2 and 3, for the first 1/60 of a second, the potential of the grid 24 is made positive with respect to the potential of the grid 26. During this time interval the electron beam will impinge only on the blue image strips as the beam moves horizontally from left to right approximately 262 times (i.e. 15,735/60) while moving vertically once from top to bottom. This would correspond to a "blue" frame.

In accordance with the wave shape shown in Fig. 3, for the next 1/60 of a second the difference of potential between grid 24 and grid 26 is zero. Therefore, the beam will be undeflected by the grids 24 and 26 and will impinge only on the green image strips as it is horizontally and vertically scanned. This would correspond to a "green" frame.

For the next 1/60 of a second, the grid 24 will be negative with respect to the grid 26 and accordingly the electron beam will be deflected toward the rods of the grid 26 and will impinge only on the red image strips. This would correspond to a "red" frame.

Since the repetition of the wave shape illustrated in Fig. 3 is 20 times a second it is apparent that a total of 60 frames of the image will be transmitted each second. These 60 frames will be composed of 20 blue frames, 20 green frames, and 20 red frames. These transmitted frames can be received and displayed in a manner known in the television art wherein the various frames are superimposed so that the human eye sees only the addition of the three color imags. Even though each of the three colors comes from different adjacent areas of the image, the total width of four image strips is not larger than an elemental area of the image. Therefore after the three images are superposed in the display tube, the colors coming from the four different adjacent filter strips appear to be coming from the same spot on the image. The four multicolored displayed strip images of each spot then appear as a single color spot to the human eye, the single color being the addition of the four strip images. Accordingly, the displayed televised image accurately reproduces the color of the original object.

It should be clear that in the apparatus illustrated in Fig. 1 the current output flowing through the conductor 19 to the video amplifier 20 is substantially proportional to the intensity of the image at the point of contact of the electron beam with the image displayed on the photo-conductive surface. In a well known manner, when a photo-conductive surface is subjected to light, the conductance across the thickness of the surface at the point of impingement of the light is increased.

Accordingly, when an electron beam impinges on the same point, or on a point on the opposite side of this impingement point, the current flow through the photo-conductive surface will be proportional to the intensity of the light to which the photo-conductive surface was originally subjected. Therefore, the greater the intensity of the image on the photo-conductive surface 18, the greater will be the current flow through the photo-conductive surface to the conductive coating 17. This current will then flow out through the output conductor 19 to the video amplifier 20 from which it is sent to the transmitter or on a cable to a color receiving tube such as 22.

The photo-conductive surface 18 may be made of selenium or similar photo-conductive materials such as antimony trisulfide. It is also possible to use other types of photo-responsive materials such as photo-emissive materials which emit secondary electrons upon the impingement of an electron beam.

Instead of scanning the image on the photo-responsive surface in field sequential order as has been described above, it is also possible to use the same grid arrangement to provide a line-interlaced sequential system or a dot-interlaced sequential system. Any other available types of scanning systems may be used by properly arranging the potentials on the grid structure in synchronism with the horizontal and vertical scanning rates of the electron beam. For example, the electron beam may be horizontally scanned with the grids 24 and 26 arranged horizontally so that the beam will move parallel to the rods of the grids 24 and 26 instead of perpendicular thereto.

It should also be clear that a monochrome signal for black and white television receivers may conveniently be obtained by using only one of the three different color frames produced in each complete scanning cycle. For example, only the signal derived from the green image strips may be transmitted for use with black and white television receivers while all three signals are used for color television receivers.

It is not necessary that the color filter 11 shown in Fig. 1 be positioned between the object and the lens 12. It can be placed between the lens and the image. In the event that the objective lens 12 is composed of several different lenses it is possible to arrange the color filter between the first and the last lens. Such an arrangement is shown in Fig. 5.

In this figure the light from the object comes in the direction of the arrow 10 as before and passes through a first lens 12', a second lens 12'', the color filter 11 and the third lens 12'''. The three lenses are fixedly mounted within a cylindrical member 71 which in turn is threadedly mounted in the front end of the housing 72 of the pick-up tube. The distances between the three lenses are fixed by annular spacers 73, 74 and 76. The spacer 76 is threaded within the cylindrical member 71 to hold the three lenses in their fixed positions.

The annular spacer 74 and the cylindrical member 71 have respectively aligned openings 77 and 78 in the surfaces thereof through which the filter 11 projects. The filter 11 is mounted at the bottom thereof in a holding member 79 which in turn is slidably mounted in a bracket 81 which is fixed to a flange 82 of the housing 72. The position of the holding member 79 may be adjusted by means of the screw 83 and the lock nut 84.

Also shown in Fig. 5 mounted within the housing 72 is the optical glass plate 86 on the front edge of which is arranged a grating 87.

In operation, the distance between the filter 11 and the grating 87 is adjusted until the position of first overlap of the images of the filter strips is obtained on the photo-conductive surface (not shown). The lens may be adjusted to focus the image of the object on the photo-conductive surface by rotating the member 71 in the envelope 72. It is clear that in such rotation the distances between the three lenses remain fixed. Also, the position of the color filter 11 remains fixed since the aligned openings 77 and 78 may extend for a substantial portion of the circumferences of the spacer 74 and the cylindrical member 71, respectively.

Therefore the arrangement shown in Fig. 5 is an embodiment which may be used in a pick-up camera used in a color television studio. It is known that for such use the distance between the camera and the object may have to be varied by substantial amounts. Therefore, the arrangement which permits the focusing of the objective lens without changing the relationship between the filter and the grating is particularly advantageous.

It should also be clear that the conductive coating 17 shown in Fig. 1 need not necessarily be transparent or even translucent if the electron scanning beam scans the image on the same side of the photo-responsive surface that is facing the object. Such an arrangement is used, for example, in the well known iconoscope camera tube used for monochrome television. Also, more than two sets of color filter bands may be used for the color filter 11. It is clear that at least two sets are preferable in order to obtain the reinforced sharply defined image.

The method of the present invention may also be carried out by an apparatus wherein the photo-responsive surface is divided up into a large plurality of adjacent single color strips. To properly carry out the method of the invention the width of each of the strips must be very small so that the total width of adjacent strips of different primary colors will still be small enough in the image plane to be considered an elemental area of the image.

It will be understood that each of the elements described above, or two or more together, may also find a useful application in other types of color reproduction apparatus differing from the types described above.

While the invention has been illustrated and described as embodied in color television pick-up tube, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a color television system for producing a color image of an object, in combination, a photo-responsive surface on which the color image is to be produced; an objective lens positioned between the object and said photo-responsive surface so that said photo-responsive surface is in the focal plane of said objective lens; a color filter composed of at least two sets of color filter bands arranged side by side in a plane positioned between said object and said photo-responsive surface substantially parallel to the latter; and a grating arranged between said color filter and said photo-responsive surface substantially parallel to the latter in such a manner that the first overlap of said color filter bands caused by said grating occurs on said photo-responsive surface to increase the intensity of the colors in the produced image.

2. In a color television system for producing a color image of an object, in combination, a photo-conductive surface on which the color image is to be produced; an electrically conductive surface mounted on said photo-conductive surface and substantially coextensive therewith; an objective lens positioned between the object and said photo-conductive surface so that said photo-conductive surface is in the focal plane of said objective lens; a color filter composed of at least two sets of color filter bands arranged side by side in a plane positioned between said object and said photo-conductive surface substantially parallel to the latter; and a grating arranged between said color filter and said photo-conductive surface substantially parallel to the latter in such a manner that the first overlap of said color filter bands caused by said grating occurs on said photo-conductive surface to increase the intensity of the colors in the produced image.

3. In a color television system for producing a color image of an object, in combination, a photo-responsive surface on which the color image is to be produced; an objective lens positioned between the object and said photo-responsive surface so that said photo-responsive surface is in the focal plane of said objective lens; a color filter composed of at least two sets of color filter bands arranged side by side in a plane positioned between said object and said photo-responsive surface substantially parallel to the latter; a grating arranged between said color filter and said photo-responsive surface substantially parallel to the latter in such a manner that the first overlap of said color filter bands caused by said grating occurs on said photo-responsive surface to increase the intensity of the colors in the produced image; and means for scanning the produced image on said photo-responsive surface with an electron beam to produce current impulses substantially proportional to the intensity of the image on said photo-responsive surface at the point of contact of the electron beam.

4. In a color television system for producing a color image of an object, in combination, a photo-conductive surface on which the color image is to be produced; an electrically conductive surface mounted on said photo-conductive surface and substantially coextensive therewith; an objective lens positioned between the object and said photo-conductive surface so that said photo-conductive surface is in the focal plane of said objective lens; a color filter composed of at least two sets of color filter bands arranged side by side in a plane positioned between said object and said photo-conductive surface substantially parallel to the latter; a grating arranged between said color filter and said photo-conductive surface substantially parallel to the latter in such a manner that the first overlap of said color filter bands caused by said grating occurs on said photo-conductive surface to increase the intensity of the colors in the produced image; and means for scanning the produced image on said photo-conductive surface with an electron beam to produce current impulses substantially proportional to the intensity of the image on said photo-conductive surface at the point of contact of the electron beam.

5. In a color television system for producing a color image of an object, in combination, a photo-conductive surface on which the color image is to be produced; a transparent electrically conductive surface mounted on said photo-conductive surface and substantially coextensive therewith; an objective lens positioned between the object and said photo-conductive surface so that said photo-conductive surface is in the focal plane of said objective lens; a color filter composed of at least two sets of color filter bands arranged side by side in a plane positioned between said object and said photo-conductive surface substantially parallel to the latter; and a grating arranged between said color filter and said photo-conductive surface substantially parallel to the latter in such a manner that the first overlap of said color filter bands caused by said grating occurs on said photo-conductive surface to increase the intensity of the colors in the produced image.

6. In a color television system for producing a color image of an object, in combination, a photo-conductive surface having a first side on which the color image is to be produced and a second side; an electrically conductive surface mounted on said second side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; and a grating arranged between said color filter and said first side of said photo-conductive surface substantially parallel to the latter in such a manner that the first overlap of said color filter bands caused by said grating occurs on said first side of said photo-conductive surface to increase the intensity of the colors in the produced image.

7. In a color television system for producing a color image of an object, in combination, a photo-conductive surface having a first side on which the color image is to be produced and a second side; an electrically conductive surface mounted on said second side of said photo-conductive surface and substantially coextension therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; a grating arranged between said color filter and said first side of said photo-conductive surface substantially parallel to the latter in such a manner that the first overlap of said color filter bands caused by said grating occurs on said first side of said photo-conductive surface to increase the intensity of the colors in the produced image; and means for scanning the produced image on said first side of said photo-conductive surface with an electron beam to produce current impulses substantially proportional to the intensity of the image on said photo-conductive surface at the point of contact of the electron beam.

8. In a color television system for producing a color image of an object, in combination, a photo-conductive surface having a first side on which the color image is to be produced and a second side; a transparent electrically conductive surface mounted on said first side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; and a grating arranged between said color filter and said first side of said photo-conductive surface substantially parallel to the latter in such a manner that the first overlap of said color filter bands caused by said grating occurs on said first side of said photo-conductive surface to increase the intensity of the colors in the produced image.

9. In a color televison system for producing a color image of an object, in combination, a photo-conductive surface having a first side on which the color image is to be produced and a second side; a transparent electrically conductive surface mounted on said first side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; a grating arranged between said color filter and said first side of said photo-conductive surface substantially parallel to the latter in such a manner that the first overlap of said color filter bands caused by said grating occurs on said first side of said photo-conductive surface to increase the intensity of the colors in the produced image; and means for scanning the second side of said photo-conductive surface with an electron beam to produce current impulses substantially proportional to the intensity of the image on said photo-conductive surface at the point of contact of the electron beam.

10. In a color television system for producing a color image of an object, in combination, a photo-responsive surface on which the color image is to be produced; an objective lens positioned between the object and said photo-responsive surface so that said photo-responsive surface is in the focal plane of said objective lens; a color filter composed of at least two sets of color filter bands arranged side by side in a plane positioned between said object and said photo-responsive surface substantially parallel to the latter; and a grating having a plurality of equally spaced openings arranged in a plane between said color filter and said photo-responsive surface substantially parallel to the latter in such a manner that the first overlap of said color filter bands caused by said grating occurs on said photo-responsive surface to increase the intensity of the colors in the produced image.

11. In a color television system for producing a color image of an object, in combination, a photo-responsive surface on which the color image is to be produced; an objective lens positioned between the object and said photo-responsive surface so that said photo-responsive surface is in the focal plane of said objective lens; a color filter composed of at least two sets of color filter bands arranged side by side in a plane positioned between said object and said photo-responsive surface substantially parallel to the latter, each of said filter bands having at least a blue strip, a red strip and two green strips, said strips being substantially parallel to one other and contiguous in such manner that each of said blue and red strips has a green strip arranged on either side thereof; and a grating having a plurality of equally spaced openings arranged in a plane between said color filter and said photo-responsive surface substantially parallel to the latter in such a manner that the first overlap of said color filter bands caused by said grating occurs on said photo-responsive surface to increase the intensity of the colors in the produced image.

12. In a color television system for producing a color image of an object, in combination, a photo-responsive surface on which the color image is to be produced; an objective lens positioned between the object and said photo-responsive surface so that said photo-responsive surface is in the focal plane of said objective lens; a color filter composed of at least two sets of color filter bands arranged side by side in a plane positioned between said object and said photo-responsive surface substantially parallel to the latter; and a grating having a plurality of parallel lines thereon, said grating being arranged between said color filter and said photo-responsive surface substantially parallel to the latter, said lines of said grating being substantially parallel to the bands of said color filter in such a manner that the first overlap of said color filter bands caused by said grating occurs on said photo-responsive surface to increase the intensity of the colors in the produced image.

13. In a color television system for producing a color image of an object, in combination, a photo-conductive surface on which the color image is to be produced; an electrically conductive surface mounted on said photo-conductive surface and substantially coextensive therewith; an objective lens positioned between the object and said photo-conductive surface so that said photo-conductive surface is in the focal plane of said objective lens; a color filter composed of at least two sets of color filter bands arranged side by side in a plane positioned between said object and said photo-conductive surface substantially parallel to the latter; and a grating having a plurality of parallel lines thereon, said grating being arranged between said color filter and said photo-conductive surface substantially parallel to the latter, said lines of said grating being substantially parallel to the bands of said color filter in such a manner that the first overlap of said color filter bands caused by said grating occurs on said photo-conductive surface to increase the intensity of the colors in the produced image.

14. In a color television system for producing a color image of an object, in combination, a photo-responsive surface on which the color image is to be produced; an objective lens positioned between the object and said photo-responsive surface so that said photo-responsive surface is in the focal plane of said objective lens; a color filter composed of at least two sets of color filter bands arranged side by side in a plane positioned between said object and said photo-responsive surface substantially parallel to the latter; a grating having a plurality of parallel lines thereon, said grating being arranged between said color filter and said photo-responsive surface substantially parallel to the latter, said lines of said grating being substantially parallel to the bands of said color filter in such a manner that the first overlap of said color filter bands caused by said grating occurs on said photo-responsive surface to increase the intensity of the colors in the produced image; and means for scanning the produced image on said photo-responsive surface with an electron beam to produce current impulses substantially proportional to the intensity of the image on said photo-responsive surface at the point of contact of the electron beam.

15. In a color television system for producing a color image of an object, in combination, a photo-conductive surface on which the color image is to be produced; an electrically conductive surface mounted on said photo-conductive surface and substantially coextensive therewith; an objective lens positioned between the object and said photo-conductive surface so that said photo-conductive surface is in the focal plane of said objective lens; a color filter composed of at least two sets of color filter bands arranged side by side in a plane positioned between said object and said photo-conductive surface substantially parallel to the latter; a grating having a plurality of parallel lines thereon, said grating being arranged between said color filter and said photo-conductive surface substantially parallel to the latter, said lines of said grating being substantially parallel to the bands of said color filter in such a manner that the first overlap of said color filter bands caused by said grating occurs on said photo-conductive surface to increase the intensity of the colors in the produced image; and means for scanning the produced image on said photo-conductive service with an electron beam to produce current impulses substantially proportional to the intensity of the image on said photo-conductive surface at the point of contact of the electron beam.

16. In a color television system for producing a color image of an object, in combination, a photo-conductive surface on which the color image is to be produced; a transparent electrically conductive surface mounted on said photo-conductive surface and substantially coextensive therewith; an objective lens positioned between the object and said photo-conductive surface so that said photo-conductive surface is in the focal plane of said objective lens; a color filter composed of at least two sets of color filter bands arranged side by side in a plane positioned between said object and said photo-conductive surface substantially parallel to the latter; and a grating having a plurality of parallel lines thereon, said grating being arranged between said color filter and said photo-conductive surface substantially parallel to the latter, said lines of said grating being substantially parallel to the bands of said color filter in such a manner that the first overlap of said color filter bands caused by said grating occurs on said photo-conductive surface to increase the intensity of the colors in the produced image.

17. In a color television system for producing a color image of an object, in combination, a photo-conductive surface having a first side on which the color image is to be produced and a second side; an electrically conductive surface mounted on said second side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; and a grating having a plurality of parallel lines thereon, said grating being arranged between said color filter and said first side of said photo-conductive surface substantially parallel to the latter, said lines of said grating being substantially parallel to the bands of said color filter in such a manner that the first overlap of said color filter bands caused by said grating occurs on said first side of said photo-conductive surface to increase the intensity of the colors in the produced image.

18. In a color television system for producing a color image of an object, in combination, a photo-conductive surface having a first side on which the color image is to be produced and a second side; an electrically conductive surface mounted on said second side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; a grating having a plurality of parallel lines thereon, said grating being arranged between said color filter and said first side of said photo-conductive surface substantially parallel to the latter, said lines of said grating being substantially parallel to the bands of said color filter in such a manner that the first overlap of said color filter bands caused by said grating occurs on said first side of said photo-conductive surface to increase the intensity of the colors in the produced image; and means for scanning the produced image on said first side of said photo-conductive surface with an electron beam to produce current impulses substantially proportional to the intensity of the image on said photo-conductive surface at the point of the contact of the electron beam.

19. In a color television system for producing a color image of an object, in combination, a photo-conductive surface having a first side on which the color image is to be produced and a second side; a transparent electrically conductive surface mounted on said first side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; and a grating having a plurality of parallel lines thereon, said grating being arranged between said color filter and said first side of said photo-conductive surface substantially parallel to the latter, said lines of said grating being substantially parallel to the bands of said color filter in such a manner that the first overlap of said color filter bands caused by said grating occurs on said first side of said photo-conductive surface to increase the intensity of the colors in the produced image.

20. In a color television system for producing a color image of an object, in combination, a photo-conductive surface having a first side on which the color image is to be produced and a second side; a transparent electrically conductive surface mounted on said first side of said photo-conductive surface and substantially coextensive therewith; an objective lens positioned between the object and said first side of said photo-conductive surface so that said first side of said photo-conductive surface is in the focal plane of said objective lens; a color filter composed of at least two sets of color filter bands arranged side by side in a plane positioned between said object and said first side of said photo-conductive surface substantially parallel to the latter; a grating having a plurality of parallel lines thereon, said grating being arranged between said color filter and said first side of said photo-conductive surface substantially parallel to the latter, said lines of said grating being substantially parallel to the bands of said color filter in such a manner that the first overlap of said color filter bands caused by said grating occurs on said first side of said photo-conductive surface to increase the intensity of the colors in the produced image; and means for scanning the second side of said photo-conductive surface with an electron beam to produce current impulses substantially proportional to the intensity of the image on said photo-conductive surface at the point of the contact of the electron beam.

21. In an apparatus for making color separations from a color image produced by an objective lens, in combination, a color filter arranged adjacent the objective lens and substantially parallel thereto, said color filter including at least two sets of color strips; a photo-electric surface arranged in the focal plane of the objective lens and substantially parallel thereto; and a grating having a plurality of grating apertures disposed between said color filter and said photo-electric surface, said grating being arranged in such a manner that the image of said sets of color strips of said filters formed by each of said grating apertures have their first overlap on said photo-electric surface in said focal plane and two or more image portions arrive through different filter strips of the same color through different areas of the objective lens and different aperture of said grating to produce on the strips of color separations on said photo-electric surface a predetermined pattern of electrically charged carriers.

22. In an apparatus for making color separations from a color image produced by an objective lens, in combination, a color filter arranged adjacent the objective lens and substantially parallel thereto, said color filter including at least two sets of color strips; a photo-electric surface arranged in the focal plane of the objective lens and substantially parallel thereto; a grating having a plurality of grating apertures disposed between said color filter and said photo-electric surface, said grating being arranged in such a manner that the images of said sets of color strips of said filters formed by each of said grating apertures have their first overlap on said photo-electric surface in said focal plane and two or more image portions arrive through different filter strips of the same color through different areas of the objective lens and different apertures of said grating to produce on the strips of color separations on said photo-electric surface a predetermined pattern of electrically charged carriers; and means including an electron beam for scanning the strips of color separations in a predetermined sequence.

23. In an apparatus for making color separations from a color image produced by an objective lens, in combination, a color filter arranged adjacent the objective lens and substantially parallel thereto, said color filter including at least two sets of color strips; a photo-electric surface arranged in the focal plane of the objective lens and substantially parallel thereto; a grating having a plurality of grating apertures disposed between said color filter and said photo-electric surface, said grating being arranged in such a manner that the images of said sets of color strips of said filters formed by each of said grating apertures have their first overlap on said photo-electric surface in said focal plane and two or more image portions arrive through different filter strips of the same color through different areas of the objective lens and different apertures of said grating to produce on the strips of color separations on said photo-electric surface a predetermined pattern of electrically charged carriers; at least two sets of linear conductors arranged adjacent said photo-electric surface, each of said sets of linear conductors being equal in number to said grating apertures; means for applying operating potentials to said sets of linear conductors; and means for scanning said photo-electric surface with an electron beam, the potentials of said linear conductors determining the sequence of scanning of said strips of color separations.

24. In an apparatus for making color separations from a color image produced by an objective lens, in combination, a color filter arranged adjacent the objective lens and substantially parallel thereto, said color filter including at least two sets of color strips; a photo-electric surface arranged in the focal plane of the objective lens and substantially parallel thereto; a grating having a plurality of grating apertures disposed between said color filter and said photo-electric surface, said grating being arranged in such a manner that the images of said sets of color strips of said filters formed by each of said grating apertures have their first overlap on said photo-electric surface in said focal plane and two or more image portions arrive through different filter strips of the same color through different areas of the objective lens and different apertures of said grating to produce on the strips of color separations on said photo-electric surface a predetermined pattern of electrically charged carriers; means for scanning the strips of color separations on said photo-electric surface with an electron beam; at least two sets of linear conductors arranged between said electron beam and said photo-electric surface, each of said sets of linear conductors being equal in number to said grating apertures, said linear conductors being parallel to each other and to said grating apertures; and means for applying operating potentials to said sets of linear conductors for determining the sequence of scanning of said strips of color separation.

References Cited in the file of this patent

UNITED STATES PATENTS

| | | |
|---|---|---|
| 2,446,791 | Schroeder | July 10, 1948 |
| 2,479,820 | De Vore | Aug. 23, 1949 |
| 2,532,511 | Okolicsanyi | Dec. 5, 1950 |
| 2,661,392 | Lubszynski | Dec. 1, 1953 |
| 2,696,520 | Bradley | Dec. 7, 1954 |
| 2,703,340 | Hoyt | Mar. 1, 1955 |
| 2,705,741 | Griffin | Apr. 5, 1955 |
| 2,734,938 | Goodale | Feb. 14, 1956 |